(12) United States Patent
Niedert et al.

(10) Patent No.: US 11,548,334 B2
(45) Date of Patent: Jan. 10, 2023

(54) METHODS AND APPARATUS FOR A SINGLE PIN LOAD SENSOR COUPLED TO A HITCH RECEIVER

(71) Applicant: Ford Global Technologies, LLC, Dearborn, MI (US)

(72) Inventors: Andrew Niedert, Farmington Hills, MI (US); Anton Rogness, Dearborn, MI (US); Elliott Pearson, Shelby Township, MI (US); Joshua Rajasingh, Ypsilanti, MI (US); Peter Simeon Lazarevski, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 775 days.

(21) Appl. No.: 16/379,463

(22) Filed: Apr. 9, 2019

(65) Prior Publication Data

US 2019/0381844 A1    Dec. 19, 2019

Related U.S. Application Data

(60) Provisional application No. 62/687,061, filed on Jun. 19, 2018.

(51) Int. Cl.
| | | |
|---|---|---|
| *B60D 1/62* | (2006.01) | |
| *G01L 1/12* | (2006.01) | |
| *B60D 1/24* | (2006.01) | |
| *B60D 1/06* | (2006.01) | |
| *G01L 5/13* | (2006.01) | |

(52) U.S. Cl.
CPC ............... *B60D 1/62* (2013.01); *B60D 1/065* (2013.01); *B60D 1/248* (2013.01); *G01L 1/12* (2013.01); *G01L 5/136* (2013.01)

(58) Field of Classification Search
CPC .......... B60D 1/62; B60D 1/065; B60D 1/248; B60D 1/485; G01L 1/12; G01L 5/136; G01L 5/16
See application file for complete search history.

(56) References Cited

U.S. PATENT DOCUMENTS

| | | | |
|---|---|---|---|
| 6,234,508 B1 * | 5/2001 | Tuttle .................. | A01B 59/004 |
| | | | 280/446.1 |
| 9,347,845 B2 | 5/2016 | Gießibl | |
| 2013/0018552 A1 * | 1/2013 | Foster ...................... | G01L 5/16 |
| | | | 701/50 |

(Continued)

FOREIGN PATENT DOCUMENTS

| | | |
|---|---|---|
| DE | 102014217801 | 3/2016 |
| EP | 2589503 | 6/2017 |

(Continued)

*Primary Examiner* — Kevin Hurley
*Assistant Examiner* — Marlon A Arce
(74) *Attorney, Agent, or Firm* — Lorne Forsythe; Hanley, Flight & Zimmerman LLC

(57) ABSTRACT

Methods, apparatus, systems and articles of manufacture are disclosed to facilitate a single pin load sensor coupled to a hitch receiver, the sensor to measure one or more loads on the hitch receiver. An example apparatus includes a load sensing pin coupled to a hitch receiver of a vehicle, the load sensing pin disposed in a cavity of a crossbar that is to couple the hitch receiver to the vehicle, wherein the load sensing pin is to measure a load transferred from the hitch receiver to the crossbar.

16 Claims, 8 Drawing Sheets

(56) References Cited

U.S. PATENT DOCUMENTS

| | | | | |
|---|---|---|---|---|
| 2014/0027999 | A1* | 1/2014 | Boittin | A01B 59/002 |
| | | | | 280/504 |
| 2015/0137482 | A1 | 5/2015 | Woolf et al. | |
| 2016/0033344 | A1* | 2/2016 | Bradshaw | G01L 1/2262 |
| | | | | 73/761 |
| 2019/0263204 | A1* | 8/2019 | Reed | G01G 19/021 |
| 2019/0265112 | A1* | 8/2019 | Reed | G01L 3/102 |

FOREIGN PATENT DOCUMENTS

| | | |
|---|---|---|
| WO | 2017125105 | 7/2017 |
| WO | 2017144084 | 8/2017 |

\* cited by examiner

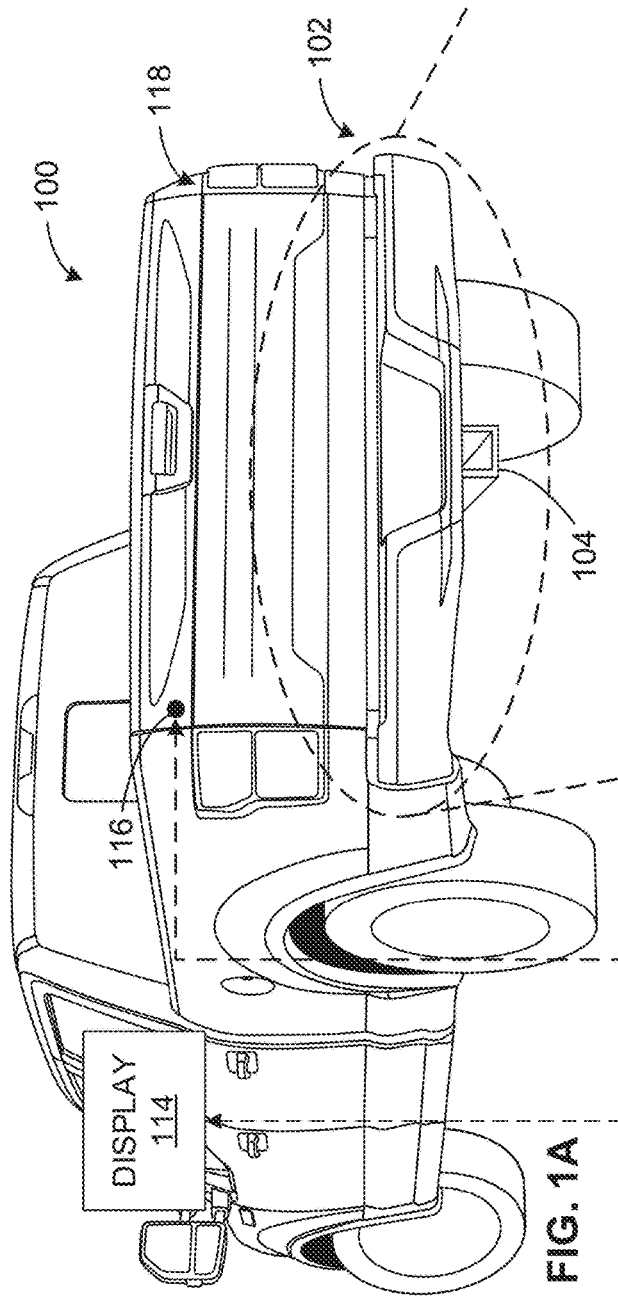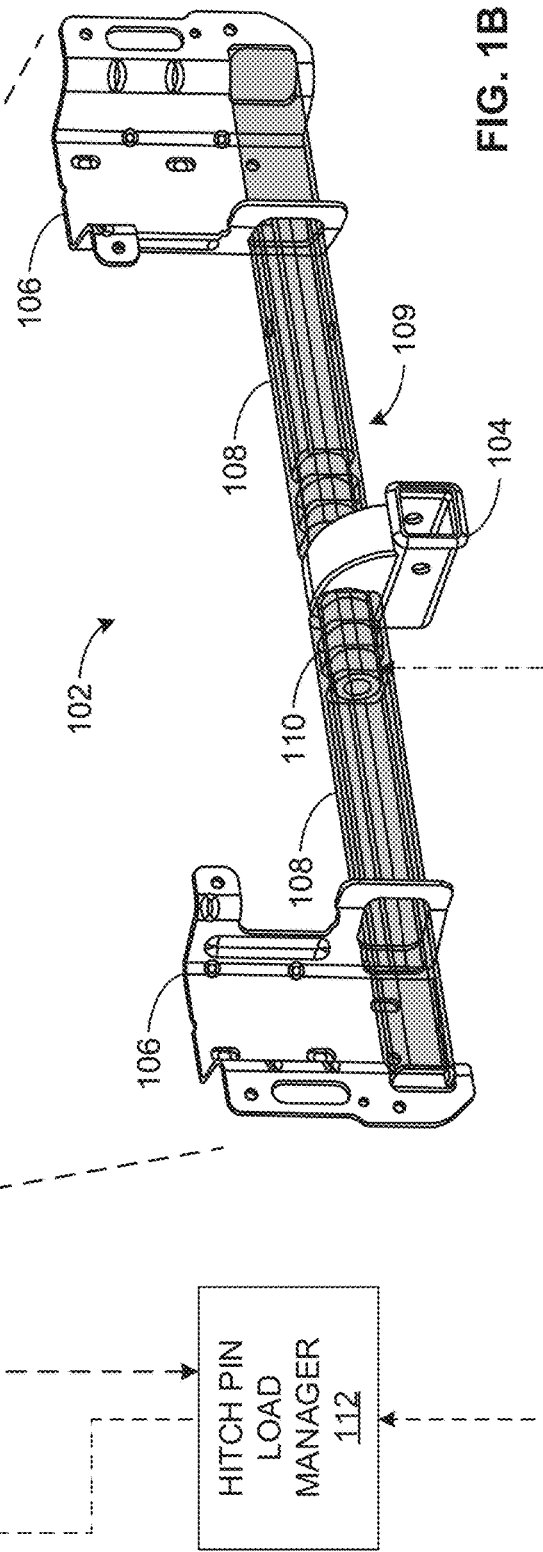
FIG. 1A
FIG. 1B

METHODS AND APPARATUS FOR A SINGLE PIN LOAD SENSOR COUPLED TO A HITCH RECEIVER

RELATED APPLICATION

This patent claims priority to U.S. Provisional Application Ser. No. 62/687,061, which was filed on Jun. 19, 2018. U.S. Provisional Application Ser. No. 62/687,061 is hereby incorporated herein by reference in its entirety.

FIELD OF THE DISCLOSURE

This disclosure relates generally to vehicles and, more particularly, to methods and apparatus for a single pin load sensor coupled to a hitch receiver.

BACKGROUND

In recent years, consumer vehicles capable of pulling trailers have implemented additional data processing capabilities. With these capabilities, vehicles can process parameters of a vehicle and/or trailer not previously processed, providing additional insights to a user of the vehicle. For example, an additional parameter of the vehicle that can be processed is the loading experienced at the trailer hitch indicative of various characteristics of the trailer (e.g., weight, load orientation, braking force, etc.).

BRIEF DESCRIPTION OF THE DRAWINGS

FIGS. 1A-1B illustrate an example vehicle including a hitch pin load manager and a load sensing pin by which the examples disclosed herein can be implemented.

The figures are not to scale. In general, the same reference numbers will be used throughout the drawing(s) and accompanying written description to refer to the same or like parts.

DETAILED DESCRIPTION

Figure 2:
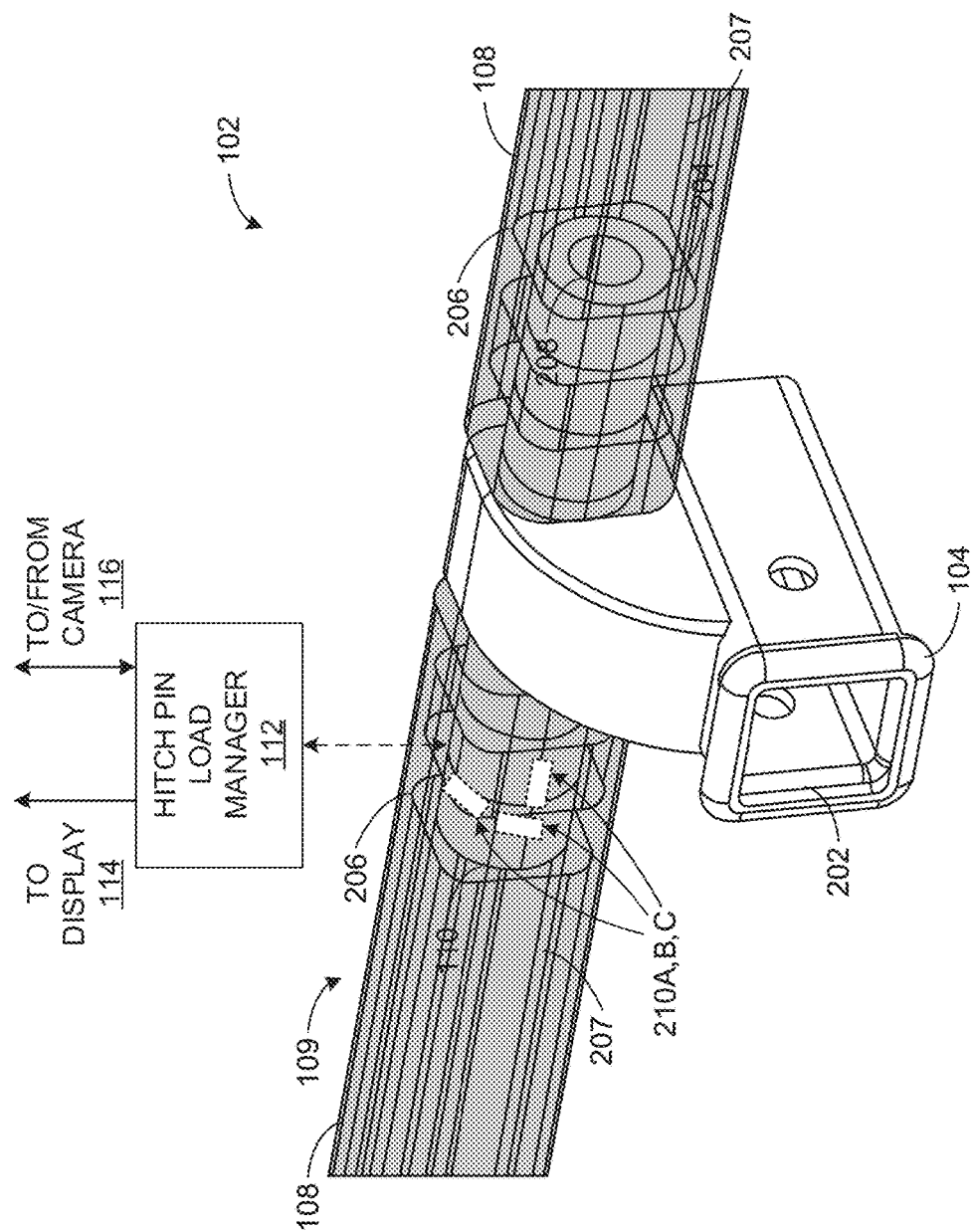
FIG. 2 illustrates an example isometric view of the load sensing pin of FIGS. 1A-1B.

Consumer vehicles capable of pulling trailers can implement additional data processing capabilities. With these capabilities, vehicles can process parameters of a vehicle and/or trailer not previously processed, providing additional insights to a user of the vehicle. For example, an additional parameter of the vehicle that can be processed is the loading experienced at the trailer hitch. The loading experienced at the trailer hitch is indicative of various characteristics (e.g., weight, load orientation, braking force, etc.) of the trailer. However, to process the loading experienced at the trailer hitch receiver, one or more of the loads need to be obtained by a sensor.

In some known implementations, two load sensing pins mounted external to a hitch receiver and crossbar are configured to measure a force load in one or more directions (e.g., a vertical load (tongue load), a longitudinal load (direction of travel of the vehicle), a lateral load, multiple orthogonal loads, etc.) as well as a torque load in one or more directions. However, for some vehicles, the packaging size of such implementations using two load sensing pins may not be feasible or practical. For example, in trucks that implement a spare tire underneath the pickup bed, the spare tire may not allow for mounting of the two load sensing pins. In other examples, packaging constraints associated with a bumper cover of the vehicle may not allow for mounting of two load sensing pins.

Examples disclosed herein address the above noted problems of known implementations by determining one or more load characteristics at the trailer hitch receiver using a single load sensing pin mounted in an interior (e.g., in a cavity) of at least one of the crossbar or the hitch receiver.

In accordance with the teachings of this disclosure, a load sensing hitch pin and a hitch pin load manager can have various configurations that depend on a type of vehicle and/or hitch receiver coupled to a vehicle. In examples disclosed herein, these configurations can be changed or altered to minimize the packaging space of the load sensing hitch pin while ensuring robust data capture by the load sensing hitch pin and hitch pin load manager.

FIGS. 1A and 1B illustrate an example vehicle 100 including an example hitch receiver assembly 102. In the illustrated example of FIG. 1B, the hitch receiver assembly 102 further includes an example hitch receiver 104, two example hitch assembly mounting plates 106, two example crossbar segments 108 forming an example crossbar 109, and an example load sensing pin 110. Further in the illustrated example, the load sensing pin 110 is communicatively coupled to an example hitch pin load manager 112 that is communicatively coupled to at least one of a display 114 and/or a camera 116.

In the illustrated example of FIG. 1, each of the mounting plates 106 is coupled to a hard point of the vehicle 100. For example, the mounting plates 106 can, in some examples, be mounted to a frame of the vehicle 100. Each of the mounting plates 106 is to receive an end of a respective one of the two crossbars segments 108 to constrain the crossbar 109 from lateral motion. Additionally, the hitch receiver 104, included in the hitch receiver assembly 102, is coupled to the crossbar 109 via the load sensing pin 110, and the load sensing pin 110 is rotatably coupled to the hitch receiver 104.

Looking to the schematic portion of FIGS. 1A-1B, the hitch pin load manager 112 is communicatively coupled to the load sensing pin 110 to receive one or more unprocessed load signals (e.g., force and torque signals) from the load sensing pin 110. In some examples, the hitch pin load manager 112 can query the load sensing pin 110 to acquire the load signals, which may be processed to determine loading values.

Additionally, the hitch pin load manager 112 can be communicatively coupled to the display 114 included in a cabin (e.g., interior) of the vehicle 100. In some examples, the display 114 receives one or more loading values of the hitch receiver 104 as determined by the hitch pin load manager 112. In other examples, the display 114 receives a warning including one or more loading values exceeding a respective threshold from the hitch pin load manager 112. In each example, the display 114 outputs the received values for a user of the vehicle 100 by at least one of a visual and/or auditory alert.

The hitch pin load manager 112 is additionally communicatively coupled to the camera 116. In some examples, the camera 116 is mounted on a rear facing surface of the vehicle 100 (e.g., the camera 116 is a rear facing camera) such as, for example, a tailgate 118 of the vehicle 100. The camera 116 can acquire images to determine a location and/or orientation of the hitch receiver 104 and distribute this information to the hitch pin load manager 112. For example, the camera 116 can determine a distance (e.g., vertical distance, horizontal distance, etc.) from a reference point (e.g., the crossbar 109) to the hitch receiver 104. In some examples, the camera 116 further determines a location and/or orientation of a trailer hitch ball (e.g., shown in connection with FIGS. 4A-4C). For example, the camera 116 can determine a length of a drawbar connecting the trailer hitch ball to the hitch receiver 104 (e.g., a horizontal distance from the crossbar 109 to the trailer hitch ball) and/or a drop of the drawbar (e.g., a vertical distance from the crossbar 109 to the trailer hitch ball).

FIG. 2 is an isometric view further detailing at least the example hitch receiver 104, the example crossbar segments 108 included in the crossbar 109 and the example load sensing pin 110 of the example hitch receiver assembly 102. In the illustrated example, the hitch receiver 104 further includes an example hitch receiver cavity 202. In some examples, the hitch receiver cavity 202 includes geometry corresponding to geometry of a trailer hitch (e.g., a trailer hitch mount having a hitch ball to couple the vehicle 100 to the trailer) to be inserted into the hitch receiver cavity 202. Further, the hitch receiver 104 is rigidly coupled to the load sensing pin 110.

Additionally, in the illustrated example, each of the crossbar segments 108 further includes a cavity 206, the geometry of the cavity 206 to, in at least one dimension (e.g., a width, a length, a diameter, etc.), correspond to the geometry of the load sensing pin 110. Additionally or alternatively, each of the crossbar segments 108 can be hollow. In such examples, blocks 207 are disposed in the crossbar segments 108 and include the cavities 206, which are to correspond to one or more dimensions of the load sensing pin 110. In some examples, the cavities 206 are substantially centered in the respective crossbar segments 108.

In some examples, the load sensing pin 110 can be disposed inside of one or more of the cavities 206. In such examples, a relative orientation of the load sensing pin 110 relative to the crossbar segments 208 can be constrained by a geometry feature of at least one of the load sensing pin 110 and the crossbar segments 108. For example, the load sensing pin 110 can include a keyed shape and the cavities 206 of the crossbar segments 108 can include a corresponding keyway. Additionally or alternatively, the load sensing pin 110 can be sized such that the fit with the cavities 206 of the crossbar segments 108 includes a material interference (e.g., a press fit). Additionally or alternatively, the load sensing pin 110 can include one or more spline teeth and the cavities 206 of the crossbar segments 108 can include one or more corresponding spline receiver slots.

In some examples, the load sensing pin 110 further includes sensing elements 210A,B,C. In some examples, the sensing elements 210A,B,C are at least one of strain gauges or load cells oriented in the load sensing pin 110 such that each of the sensing elements 210A,B,C measures a force load in an orthogonal direction (e.g., longitudinal load, lateral load, vertical load, etc.) different from the other sensing elements 210A,B,C. Further, the load sensing elements 210A,B,C can be oriented in such a manner that the hitch pin load manager 112 can determine one or more torque loads on the load sensing pin 110 based upon the force loads measured. In other examples, the load sensing pin 110 is a magnetoelastic load sensing pin (e.g., composed of a material capable of sensing a load by measuring a change in a magnetic field) and one or more portions of the load sensing pin 110 provide the sensing elements 210A,B,C.

Thus, as illustrated in FIG. 2, the hitch receiver 104 is not directly coupled to either of the crossbar segments 108 and is instead coupled to the load sensing pin 110, and the load sensing pin 110 is coupled to the crossbar segments 108. Further, based upon this configuration, all loading experienced by the hitch receiver 104 is transferred to the crossbar segments 108 via the load sensing pin 110, enabling the sensing elements 210A,B,C, included in the load sensing pin 110 to determine one or more force and torque loads applied to the hitch receiver 104. Further, while in the illustrated example one load sensing pin 110 is illustrated, additional load sensing pins 110 may be disposed in the cavities 206 of the cross bar segments 208 in other examples (e.g., two load sensing pins 110, three load sensing pins 110, etc.).

Figure 3:
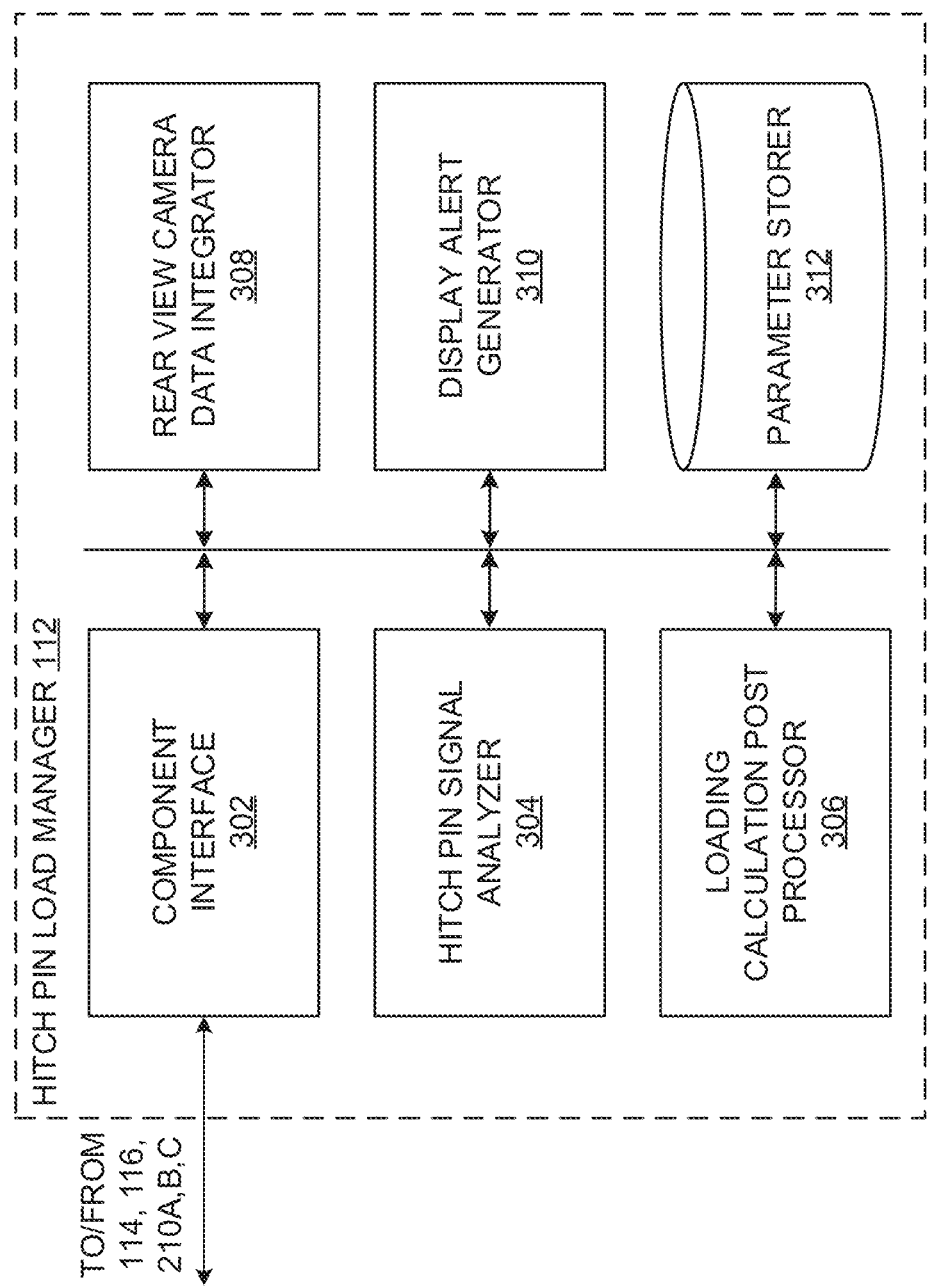
FIG. 3 is a block diagram detailing the example hitch pin load manager of FIG. 1.

FIG. 3 is a block diagram of an example implementation of the example hitch pin load manager 112 of FIG. 1. The hitch pin load manager 112 can, in some examples such as the illustrated example of FIG. 3, include an example component interface 302, an example hitch pin signal analyzer 304, an example loading calculation post processor 306, an example rear view camera data integrator 308, an example display alert generator 310, and an example parameter storer 312.

The component interface 302, included in or otherwise implemented by the hitch pin load manager 112, is capable of receiving data from and/or distributing data to at least one of the display 114, the camera 116, and/or the sensing elements 210A,B,C included in the load sensing pin 110. Additionally or alternatively, the component interface 302 can be communicatively coupled to a controller area network (CAN) bus associated with a vehicle (e.g., the vehicle 100 of FIG. 1) to receive and/or transmit information to and/or from systems of the vehicle 100 (e.g., a powertrain, an engine control module, a braking system, etc.). In some examples, the component interface 302 is further to facilitate communication between the example hitch pin signal analyzer 304, the example loading calculation post processor 306, the example rear view camera data integrator 308, the example display alert generator 310, and/or the example parameter storer 312.

The hitch pin signal analyzer 304, included in or otherwise implemented by the hitch pin load manager 112, can process the signals received from at least one of the sensing elements 210A,B,C to a signal readable by the remaining elements of the hitch pin load manager 112. In some examples, the sensing elements 210A,B,C may output analog signals (e.g., an analog voltage, an analog current, etc.). In such examples, the hitch pin signal analyzer 304 converts the analog signals into digital signals (e.g., binary signals, discrete signals, etc.) via a lookup table, an analog to digital converter (ADC), and/or a known calibration curve. Additionally or alternatively, the hitch pin signal analyzer 304 can determine whether one or more signals received from the sensing elements 210A,B,C are causing saturation of the hitch pin signal analyzer 304 (e.g., a power level of the received signal exceeds a dynamic range of the hitch pin signal analyzer 304).

In some examples, the hitch pin load manager 112 determines whether a vehicle is stationary or moving based on information received from the powertrain of the vehicle 100 by the component interface 302. For example, the hitch pin load manager 112 can determine that the vehicle 100 is stationary when the component interface 302 receives a signal from the powertrain indicating that the vehicle 100 is parked. Alternatively, the hitch pin load manager 112 determines that the vehicle 100 is moving when the component interface 302 receives a signal from the powertrain of the vehicle 100 indicating that the vehicle 100 has been shifted into a drive gear. Additionally or alternatively, the hitch pin load manager 112 can determine whether the vehicle is in motion based on at least one of a gear selection (e.g., drive, park, reverse, etc.) of the vehicle 100, telemetry data (e.g., velocity, acceleration, position, etc.) of the vehicle 100, or throttle utilization information for the vehicle 100 (e.g., from an engine control module). In some examples, the gear selection information, telemetry data, and/or throttle utilization information are received and/or retrieved from systems of the vehicle 100 by the component interface 302 (e.g., via the vehicle CAN bus).

In some examples, the hitch pin load manager 112 determines a load calculated by the sensing elements 210A,B,C of the load sensing pin 110 when the vehicle 100 is stationary (e.g., in park). For example, the hitch pin signal analyzer 304 converts the signals from the sensing elements 210A, B,C (e.g., analog signals) into load values (e.g., using a lookup table, ADC, calibration curve, etc.). In some examples, the hitch pin signal analyzer 304 calculates a horizontal load value (e.g., a longitudinal load value) and a vertical load value. In some such examples, the hitch pin signal analyzer 304 stores the horizontal load value and/or the vertical load value in the parameter storer 312. In some such examples, the horizontal load value and/or the vertical load value are stored in the parameter storer 312 when the component interface 302 receives a signal from the powertrain or another vehicle system that the vehicle 100 has been shifted from park into drive.

The loading calculation post processor 306, included in or otherwise implemented by the hitch pin load manager 112, can perform one or more post processing calculations using the processed load signals received from the hitch pin signal analyzer 304. In some examples, the one or more post processing calculations can include determining each of a static portion of the processed load and a dynamic portion (e.g., due to motion of the vehicle 100) of the processed load when the vehicle 100 is in motion. For example, the loading calculation post processor 306 can retrieve at least one of a current loading on the load sensing pin 110 from the hitch pin signal analyzer 304 and a previous loading on the load sensing pin 110 corresponding to a period of time when the vehicle 100 was stationary and stored in the parameter storer 312. In such examples, the loading calculation post processor 306 is further to subtract the stationary loading retrieved from the parameter storer 312 from the current loading on the load sensing pin 110 retrieved from the hitch pin signal analyzer 304. Further, the result of the subtraction, in some examples, corresponds to the dynamic portion of the processed load.

The rear view camera data integrator 308, included in or otherwise implemented by the hitch pin load manager 112, can retrieve image data from the camera 116 of FIG. 1. In some examples, the image data is processed by the camera 116 and the rear view camera data integrator 308 retrieves one or more position values associated with the hitch receiver 104. In some examples, the camera 116 determines a drop and/or a length of a drawbar or hitch mount coupled to the hitch receiver 104. For example, the camera 116 determines the drop of the drawbar by processing image data to determine a vertical distance between the hitch receiver 104 and a hitch ball (e.g., the hitch ball that couples the trailer coupler of the trailer to the trailer hitch mount of the vehicle 100). Additionally or alternatively, the camera 116 determines the length of the drawbar by processing image date to determine a horizontal distance from the hitch receiver 104 to the hitch ball. In other examples, the image data is not processed by the camera 116 and the rear view camera data integrator 308 determines one or more position values (e.g., parameters including at least a position and/or orientation) of the hitch receiver 104 and/or the hitch ball based upon one or more images received from the camera 116.

In some examples, the rear view camera data integrator 308 retrieves a torque loading measured by the load sensing pin 110 and corrects one or more saturated load signals based upon the position of the hitch receiver 104 determined and the torque load on the load sensing pin 110. For example, the camera 116 can determine a length and drop of the drawbar or trailer hitch mount, and the rear view camera data integrator 308 can use the torque, length of the drawbar, and drop of the drawbar to calculate a horizontal load and/or a vertical load. In some such examples, the rear view camera data integrator 308 calculates the vertical load using the torque and the length of the drawbar (e.g., the vertical load is equivalent to the torque measured at the load sensing pin 110 divided by the length of the drawbar). In some examples, in response to determining the corrected loading (e.g., completing a correction to the saturated loading), the rear view camera data integrator 308 can output the determined values to at least one of the parameter storer 312 and/or the display 114 via the component interface 302.

The display alert generator 310, included in or otherwise implemented by the hitch pin load manager 112, can generate a notification to be presented to a user (e.g., presented visually, auditorily, etc.) of the vehicle 100 via the display 114 (e.g., a driver of the vehicle 100, a passenger, etc.). In some examples, the generation of the notification further includes formatting one or more load condition values to be presented to the user via the display 114. In other examples, the generation of the notification further includes formatting one or more alerts to be presented to the user via the display 114 when one or more of the load condition values exceed a threshold. For example, an alert may be displayed via the display 114 when the horizontal load exceeds a horizontal load threshold and/or when the vertical load exceeds a vertical load threshold. Additionally or alternatively, an alert may be displayed via the display 114 when the horizontal load is outside of an acceptable range of horizontal load values and/or when the vertical load is outside of an acceptable range of vertical load values.

The parameter storer 312, included in or otherwise implemented by the hitch pin load manager 112, is capable of storing characteristics for at least one of the vehicle 100 and/or the hitch receiver 104 (e.g., a make and/or model of the vehicle 100 and/or the hitch receiver 104, historical loadings experienced by the load sensing pin 110, calibration curves and/or lookup tables for the one or more sensing elements 210A,B,C, etc.), thresholds (e.g., limits) for minimum and/or maximum trailer loading values, and suggested modifications to a loading of the trailer, among others.

While an example manner of implementing the hitch pin load manager 112 of FIG. 1 is illustrated in FIG. 3, one or more of the elements, processes and/or devices illustrated in FIG. 3 may be combined, divided, re-arranged, omitted, eliminated and/or implemented in any other way. Further, the example component interface 302, the example hitch pin signal analyzer 304, the example loading calculation post processor 306, the example rear view data integrator 308, the example display alert generator 310 and/or, more generally, the example hitch pin load manager 112 of FIG. 3 may be implemented by hardware, software, firmware and/or any combination of hardware, software and/or firmware. Thus, for example, any of the example component interface 302, the example hitch pin signal analyzer 304, the example loading calculation post processor 306, the example rear view data integrator 308, the example display alert generator 310 and/or, more generally, the example hitch pin load manager 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example component interface 302, the example hitch pin signal analyzer 304, the example loading calculation post processor 306, the example rear view data integrator 308, and the example display alert generator 310 is/are hereby expressly defined to include a non-transitory computer readable storage device or storage disk such as a memory, a digital versatile disk (DVD), a compact disk (CD), a Blu-ray disk, etc. including the software and/or firmware. Further still, the example hitch pin load manager 112 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4A:
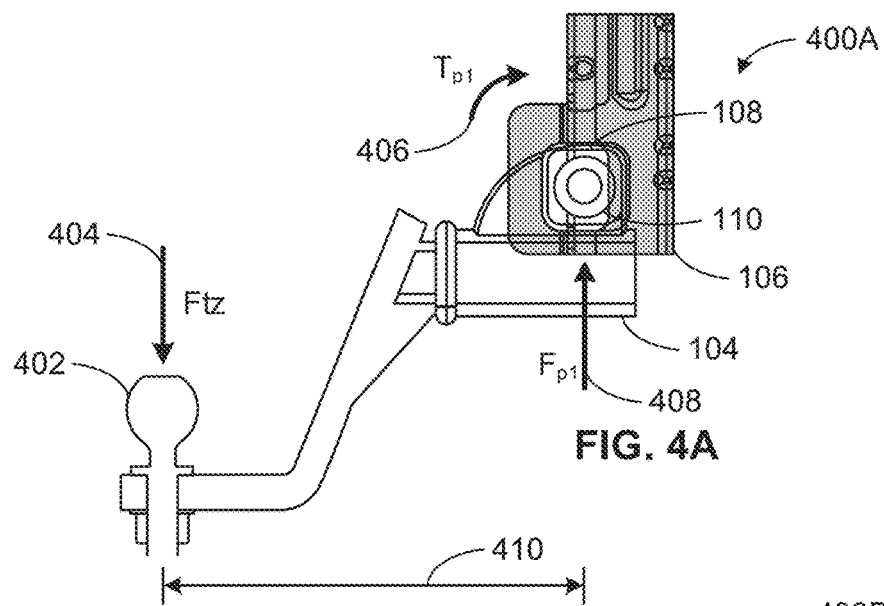
FIGS. 4A-4C illustrate three loading condition scenarios on a hitch ball associated with a trailer and the corresponding reaction forces on the load sensing pin of FIGS. 1A-1B.
Figure 4B:
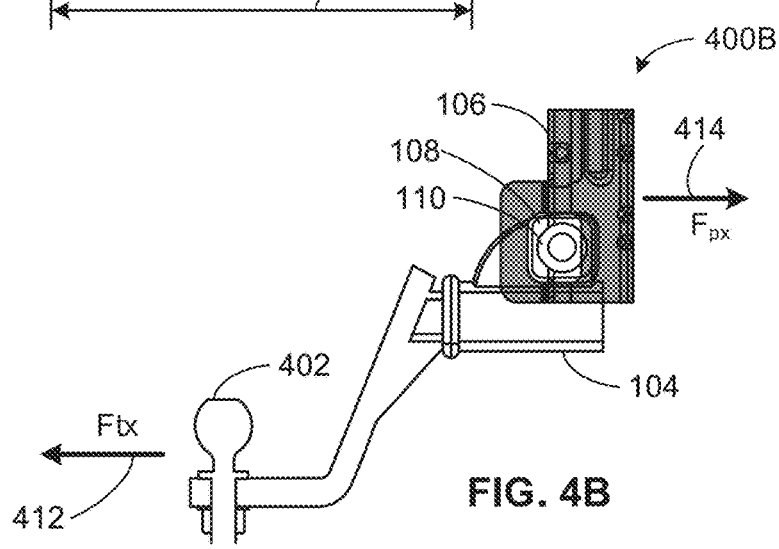
Figure 4C:
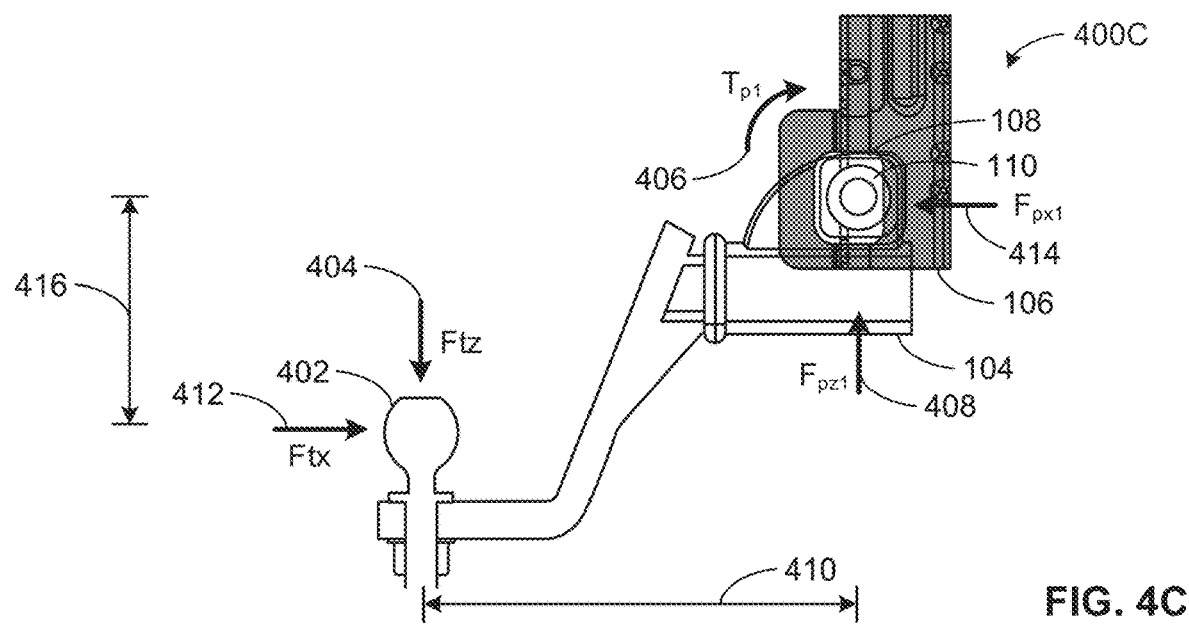

FIGS. 4A-4C illustrate loading conditions 400A, 400B, 400C experienced at the hitch receiver 104 of the vehicle 100 based on a loading applied to an example trailer hitch ball 402. The example loading conditions 400A, 400B, 400C are sensed by the load sensing pin 110 included in the crossbar segments 108.

In the illustrated example of FIG. 4A, the loading condition 400A illustrates an example vertical force 404 applied to the trailer hitch ball 402, the vertical force 404 resulting in a reaction torque 406 and a vertical reaction force 408 detected at the load sensing pin 110. In some examples, the loading condition 400A arises when the example vehicle 100 of FIG. 1 is stationary (e.g., there is no horizontal force due to movement of the vehicle 100, such as acceleration or deceleration). The example hitch pin load manager 112 of FIG. 3 may receive signals from the load sensing pin 110 indicative of the vertical reaction force 408 and/or the reaction torque 406. For example, the hitch pin signal analyzer 304 of FIG. 3 can receive an analog signal representing the vertical reaction force 408 and can convert the analog signal to a load value using a lookup table, calibration curve, ADC, etc. Additionally or alternatively, the hitch pin signal analyzer 304 can determine the reaction torque 406 based on the signal output by the load sensing pin 110.

In some examples, the signal or signals received by the hitch pin signal analyzer 304 are saturated. In such examples, the rear view camera data integrator 308 uses image data obtained by the camera 116 to calculate the vertical force 404 acting on the trailer hitch ball 402. For example, the image data obtained by the camera 116 can be used to determine a hitch mount length 410 between the load sensing pin 110 located within the crossbar 109 and the trailer hitch ball 402 (e.g., determined by the rear view camera data integrator 308 or the camera 116). In some examples, the rear view camera data integrator 308 uses the value of the reaction torque 406 measured by the load sensing pin 110 and the hitch mount length 410 to calculate the vertical force 404 (e.g., by dividing the reaction torque 406 by the hitch mount length 410).

In the illustrated example of FIG. 4B, the loading condition 400B illustrates an example horizontal force 412 applied to the trailer hitch ball 402, the horizontal force 412 resulting in a horizontal reaction force 414 at the load sensing pin 110. In some examples, the loading condition 400B arises when the vehicle 100 is moving due to acceleration or deceleration of the vehicle 100. The example hitch pin load manager 112 may receive signals from the load sensing pin 110 indicative of the horizontal reaction force 414. For example, the hitch pin signal analyzer 304 of FIG. 3 can receive an analog signal representing the horizontal reaction force 414 and can convert the analog signal to a load value using a lookup table, calibration curve, ADC, etc. In the illustrated example of FIG. 4B, the horizontal force 412 is directed away from the vehicle 100 (e.g., in a direction opposite the direction of travel of the vehicle 100). For example, the horizontal force 412 can be applied in the illustrated direction when the vehicle 100 is accelerating. Additionally or alternatively, the horizontal force 412 can act on the trailer hitch ball 402 in the opposite direction when the vehicle 100 is decelerating (e.g., braking).

In some examples, the hitch pin signal analyzer 304 stores the horizontal force 412 (e.g., equivalent to the horizontal reaction force 414) in the parameter storer 312 of FIG. 3. In some such examples, the hitch pin signal analyzer 304 stores the horizontal force 412 in the parameter storer 312 when the vehicle 100 shifts from park to drive. For example, the value of the horizontal force 412 is stored in the parameter storer 312 when the component interface 302 receives a signal from the powertrain that the vehicle 100 has been shifted from park into drive.

Looking to the illustrated example 4C, the loading condition 400C illustrates an example where the vertical force 404 and the horizontal force 412 are applied to the trailer hitch ball 402. The combination of the vertical force 404 and the horizontal force 412 in example loading condition 400C results in the reaction torque 406, the vertical reaction force 408, and the horizontal reaction force 414 at the load sensing pin 110. In some examples, the hitch pin signal analyzer 304 determines the vertical reaction force 408 and the horizontal reaction force 408 independently (e.g., the hitch pin signal analyzer 304 receives a first signal for the vertical reaction force 408 and a second signal for the horizontal reaction force 414). The hitch pin signal analyzer 304 further determines the reaction torque 406 based on signals received from the load sensing pin 110 (e.g., a third signal).

In some examples, the vertical force 404 acting on the trailer hitch ball 402 has a magnitude that is large, and the signal received by the hitch pin signal analyzer 304 (e.g., representing the vertical reaction force 408) is saturated. In such an example, the rear view camera data integrator 308 can determine the value of the vertical reaction force 408 based on the reaction torque 406 and data obtained by the camera 116. For example, the image data obtained by the camera 116 can be used to determine the hitch mount length 410, as discussed in connection with FIG. 4A, and a hitch mount drop 416 (e.g., a vertical distance between the load sensing pin 110 and the trailer hitch ball 402). When the rear view camera data integrator 308 has the value of the reaction torque 406, the hitch mount length 410, and the hitch mount drop 416, the rear view camera data integrator 308 can calculate the vertical reaction force 408 (e.g., that the hitch pin signal analyzer 304 could not process). For example, a component of the reaction torque 406 due to the horizontal force 412 can be calculated (e.g., by multiplying the hitch mount drop 416 by the horizontal reaction force 414) and subtracted from the reaction torque 406. In such an example, the value of the reaction torque 406 less the component of the reaction torque 406 due to the horizontal force 412 can be divided by the hitch mount length 410 to determine the vertical reaction force 408. Thus, the rear view camera data integrator 308 can calculate the vertical reaction force 408 when the signal received by the hitch pin signal analyzer 304 is saturated.

Figure 5:
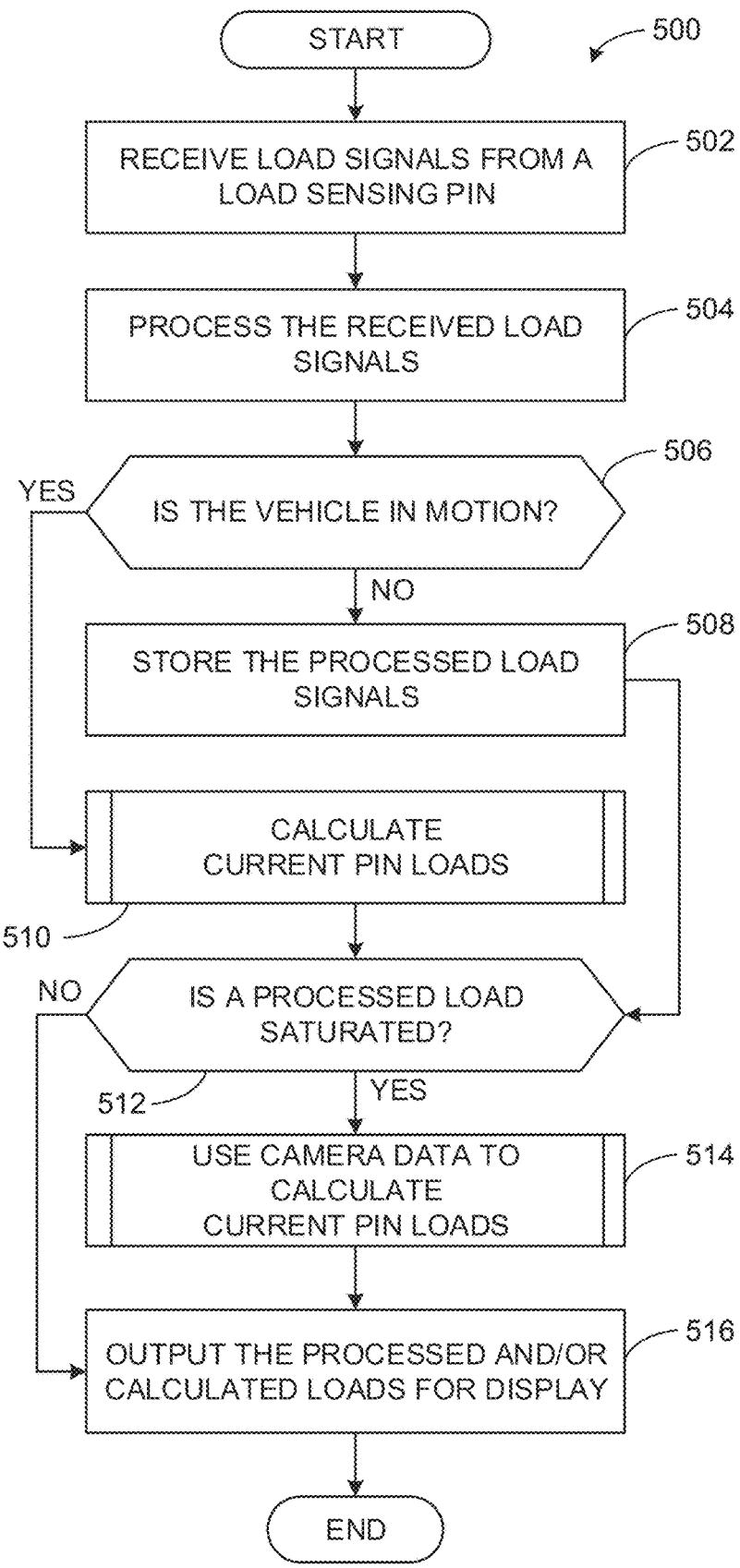
FIG. 5 is a flowchart representative of machine readable instructions that may be executed to implement the hitch pin load manager of FIGS. 1-3 to calculate a load at a trailer hitch receiver of the example vehicle of FIG. 1.
Figure 6:
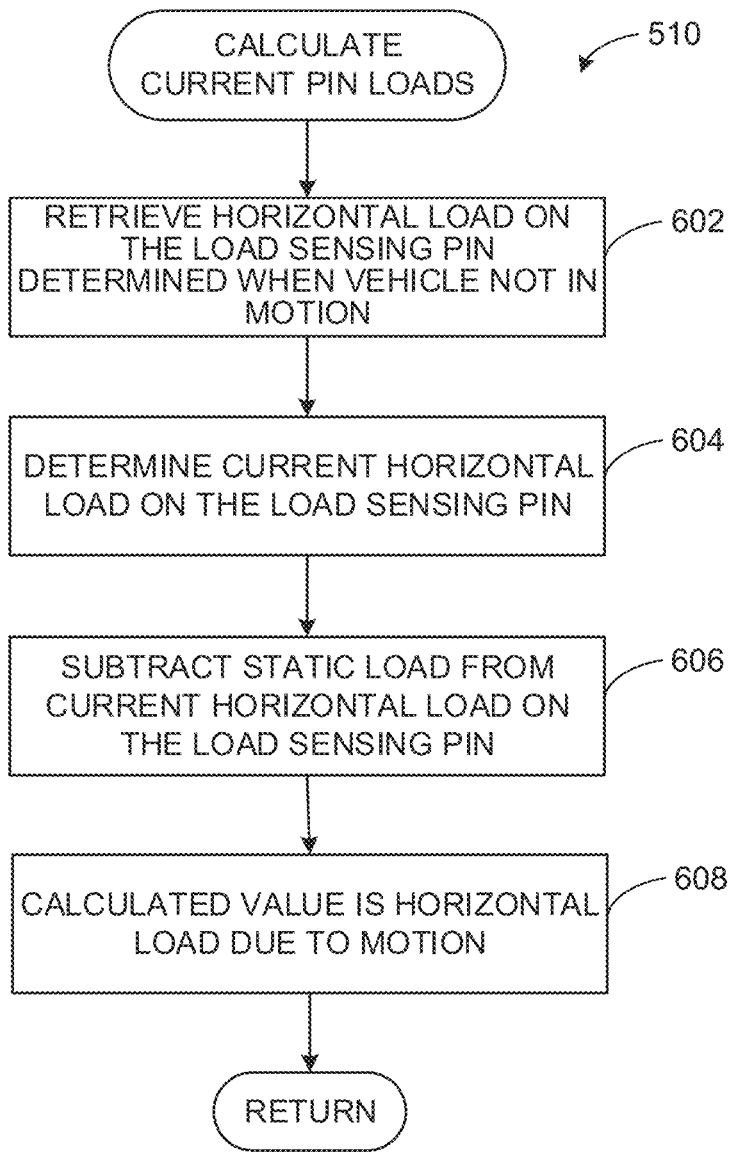
FIG. 6 is a flowchart representative of machine readable instructions that may be executed to implement the hitch pin load manager of FIGS. 1-3 to calculate current pin loads.
Figure 7:
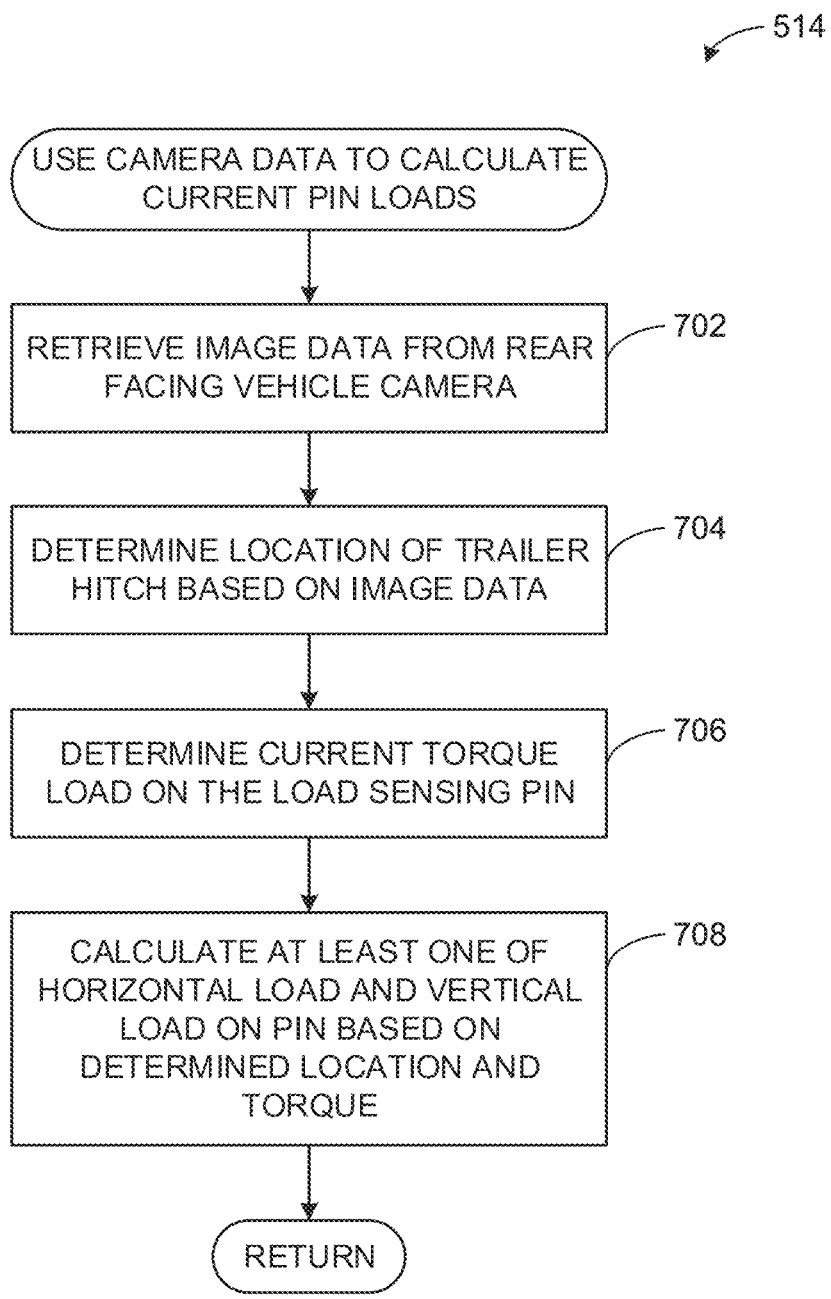
FIG. 7 is a flowchart representative of machine readable instructions that may be executed to implement the hitch pin load manager of FIGS. 1-3 to use camera data to calculate current pin loads.

Flowcharts representative of example hardware logic, machine readable instructions, hardware implemented state machines, and/or any combination thereof for implementing the hitch pin load manager 112 of FIG. 3 are shown in FIG. 5-7. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 5-7, many other methods of implementing the example hitch pin load manager 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 5 is a flowchart representative of machine readable instructions that may be executed to implement the hitch pin load manager 112 of FIGS. 1-3 to calculate a load at a trailer hitch receiver of the example vehicle 100 of FIG. 1. The process 500 of FIG. 5 begins at block 502 where hitch pin load manager 112 receives load signals from a load sensing pin (e.g., the load sensing pin 110 of FIG. 1). For example, the component interface 302 of FIG. 3 can receive one or more load signals (e.g., one or more force signals, one or more torque signals, etc.) from at least one of the load sensing elements 210A,B,C of FIG. 2 included in the load sensing pin 110.

At block 504, the hitch pin load manager 112 processes the received load signals. For example, the hitch pin signal analyzer 304 of FIG. 3 can retrieve the one or more load signals and convert them to signals readable by the remaining elements of the hitch pin load manager 112. In some examples, this can further include converting one or more analog signals received from the load sensing pin 110 into corresponding digital signals (e.g., using a lookup table, calibration curve, etc.).

At block 506, the hitch pin load manager 112 determines whether the vehicle 100 is in motion. For example, the hitch pin load manager 112 can determine whether the vehicle 100 is in motion based upon data retrieved from a powertrain system of the vehicle 100 by the example component interface 302. Additionally or alternatively, the hitch pin load manager 112 may determine whether the vehicle is stationary or in motion based on at least one of a gear selection (e.g., drive, park, reverse, etc.) of the vehicle 100, telemetry data (e.g., velocity, acceleration, position, etc.) of the vehicle 100, and/or throttle utilization information for the vehicle 100. In response to determining the vehicle is in motion, the process 500 proceeds to block 510. Alternatively, in response to determining the vehicle is stationary (e.g., not in motion) the process 500 proceeds to block 508.

The hitch pin load manager 112 further stores the processed load signals (block 508). For example, in response to determining the vehicle 100 is not in motion, the parameter storer 312 of FIG. 3 stores the one or more processed load signals (e.g., processed load values) for later retrieval.

At block 510, the hitch pin load manager 112 calculates current pin loads, discussed further in conjunction with FIG. 6 and in response to determining the vehicle 100 is in motion. For example, the loading calculation post processor 306 of FIG. 3 can determine a static component of the loading (e.g., due to a weight of a trailer coupled to the vehicle 100) on the hitch receiver 104 and a dynamic component of the loading (e.g., due to a weight of the trailer coupled to the vehicle 100 and an acceleration and/or deceleration of the vehicle 100) on the hitch receiver 104.

At block 512, the hitch pin load manager 112 determines whether the processed load is saturated (e.g., a power level of the signal exceeds a dynamic range of the hitch pin signal analyzer 304). For example, the hitch pin signal analyzer 304 can determine whether one or more signals received from the load sensing pin 110 are saturated (e.g., due to one or more loads on the load sensing pin 110 exceeding a limit, etc.) when the received one or more signals is above a maximum value that the hitch pin signal analyzer 304 can receive. In response to determining that none of the processed loads is saturated, the process 500 proceeds to block 516. Alternatively, in response to determining one or more of the loads are saturated, the process 500 proceeds to block 514.

At block 514, the hitch pin load manager 112 uses camera data to calculate current pin loads, as discussed further in conjunction with FIG. 7. For example, the rear view camera data integrator 308 of FIG. 3 can utilize positional data of the hitch receiver 104 in conjunction with loading data processed by the hitch pin signal analyzer 304 to correct the saturated loads determined at block 512.

The hitch pin load manager 112 further outputs the processed and/or calculated loads for display (block 516). For example, in response to the calculation of the current loading on the load sensing pin 110 (e.g., the loading corrected for any motion of the vehicle 100 and/or any saturation of the loads), the display alert generator 310 can generate at least one of a loading value and/or an alert regarding a loading value exceeding a threshold to be displayed by the example display 114. In response to the completion of block 516, the process 500 of FIG. 5 concludes.

FIG. 6 is a flowchart representative of machine readable instructions that may be executed to implement the hitch pin load manager 112 of FIGS. 1-3 to calculate current pin loads (e.g., block 510 of FIG. 5). With reference to the preceding figures and associated descriptions, the example process 510 of FIG. 6 begins execution at block 602, where the hitch pin load manager 112 retrieves the horizontal load on the load sensing pin when the vehicle 100 is not in motion. For example, the loading calculation post processor 306 can retrieve at least the horizontal or longitudinal (e.g., in the direction of travel of the vehicle 100) load measured by the load sensing pin 110 for a period of no motion of the vehicle 100 (e.g., from the parameter storer 312). In some examples, the loading retrieved can be for a most recent period of no motion of the vehicle 100 (e.g., a most recent horizontal load from when the vehicle 100 was in park). The loading value retrieved at block 602, in some examples, is the static load measured by the load sensing pin 110.

At block 604, the hitch pin load manager 112 determines a current horizontal load on the load sensing pin 110. For example, the hitch pin signal analyzer 304 can determine at least a current longitudinal load measured by the load sensing pin 110, the current longitudinal load including at least one of the static load and dynamic load (e.g., due to motion of the vehicle 100) measured by the load sensing pin 110.

The hitch pin load manager 112 further subtracts a static load from the current horizontal load on the load sensing pin 110 (block 606). For example, the loading calculation post processor 306 can subtract at least the horizontal loading for a stationary case retrieved at block 602 from at least the horizontal loading for a motion case determined at block 604. At block 608, the value is determined to be the horizontal load due to motion of the vehicle 100. For example, the loading calculation post processor 306 can further associate the result of the subtraction step completed at block 606 with a loading on the load sensing pin 110 due to motion of the vehicle 100. Upon completion of block 606, the process 510 of FIG. 6 concludes and processing returns to block 512 of the process 500 of FIG. 5.

FIG. 7 is a flowchart representative of machine readable instructions that may be executed to implement the hitch pin load manager 112 of FIGS. 1-3 to use camera data to calculate current pin loads (e.g., block 514 of FIG. 5). With reference to the preceding figures and associated descriptions, the example process 514 of FIG. 7 begins execution at block 702, where the hitch pin load manager 112 retrieves image data from a rear facing vehicle camera (e.g., the camera 116 of FIG. 1). For example, the rear view camera data integrator 308 can retrieve image data from the camera 116. In some examples, the image data is processed by the camera 116 and the rear view camera data integrator 308 retrieves one or more position values associated with the hitch receiver 104. In other examples, the image data is not processed by the camera 116 and is instead processed by the rear view camera data integrator 308.

At block 704, the hitch pin load manager 112 determines a location of the example hitch receiver 104 based on image data. For example, the rear view camera data integrator 308 can determine one or more position values (e.g., parameters including at least a position and/or orientation) of the hitch receiver 104 based upon one or more images received from the camera 116.

At block 706, the hitch pin load manager 112 determines current torque load on the load sensing pin 110. For example, the rear view camera data integrator 308 can retrieve a torque load measured by the load sensing pin 110. The hitch pin load manager 112 further calculates at least one of a horizontal load and a vertical load on the load sensing pin based on the determined location and the torque (block 708). For example, the rear view camera data integrator 308 can correct the one or more saturated load signals based on the position of the hitch receiver 104 determined at one of block 702 or block 704 and the torque load on the load sensing pin 110 retrieved at block 706. Upon completion of block 708, the process 514 of FIG. 7 concludes and processing returns to block 516 of the process 500 of FIG. 5.

Figure 8:
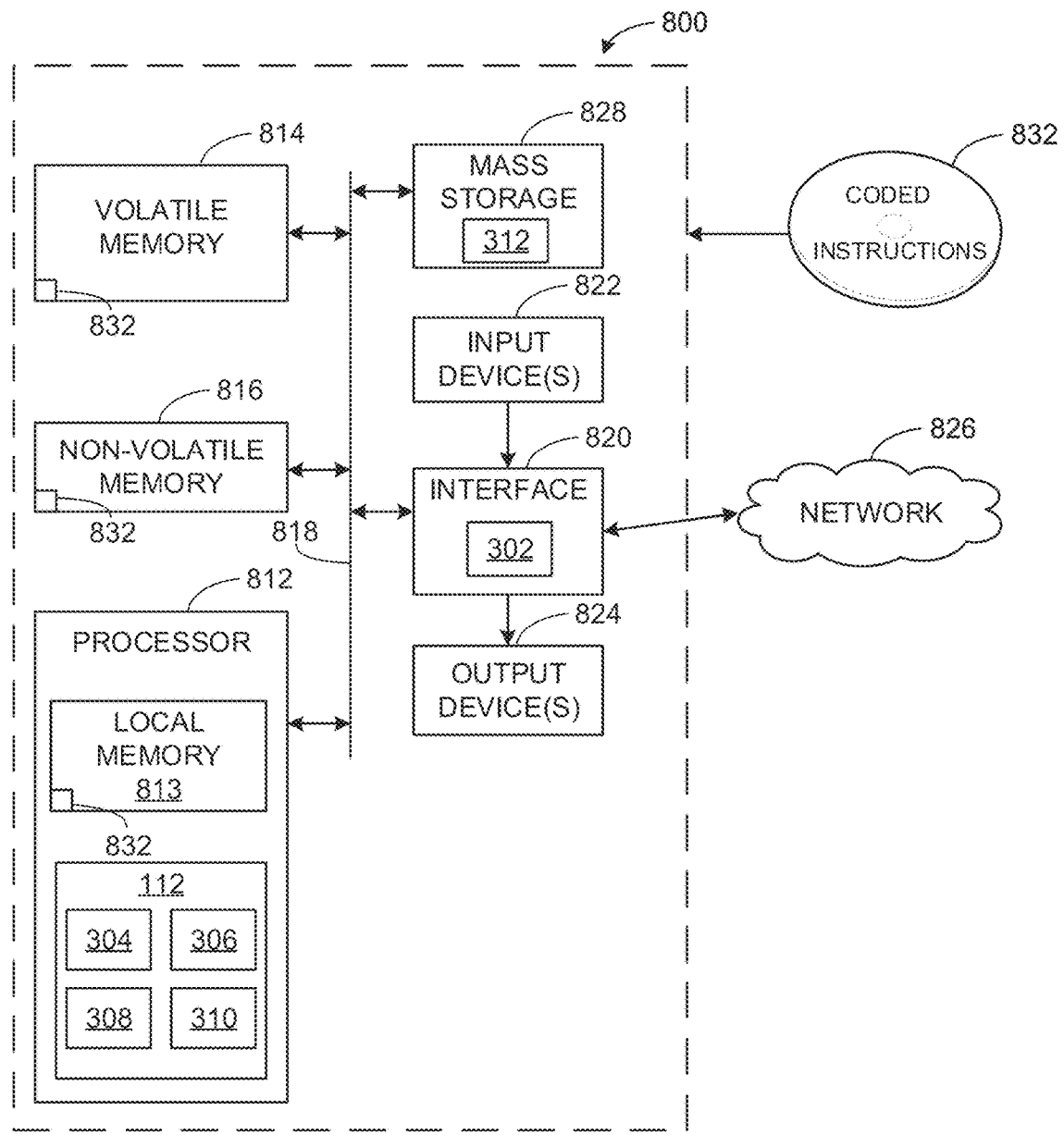
FIG. 8 is a block diagram of an example processing platform structured to execute the instructions of FIGS. 5-7 to implement the hitch pin load manager of FIGS. 1A-1B.

FIG. 8 is a block diagram of an example processor platform 800 structured to execute the instructions of FIGS. 5-7 to implement the hitch pin load manager 112 of FIG. 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example hitch pin signal analyzer 304, the example loading calculation post processor 306, the example rear view camera data integrator 308, and the example display alert generator 310

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface. In the illustrated example, the interface circuit 820 implements the component interface 302.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. In the illustrated example, the mass storage device 828 implements the parameter storer 312.

The machine executable instructions 832 of FIGS. 5-7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that measure one or more loading conditions on a hitch receiver with a single load sensing pin disposed in a crossbar that, via the load sensing pin, couples the hitch receiver to the vehicle. Further, through the requirement of only a single sensing pin that is packaged in the interior of the crossbar, an overall package size requirement of the load sensing system is decreased, forgoing the need to reposition spare tires, bumper covers, and/or other components in proximity to the design space of the load sensing pin.

Example 1 includes an apparatus comprising a load sensing pin coupled to a hitch receiver of a vehicle, the load sensing pin disposed in a cavity of a crossbar that is to couple the hitch receiver to the vehicle, wherein the load sensing pin is to measure a load transferred from the hitch receiver to the crossbar.

Example 2 includes the apparatus of example 1, wherein the load sensing pin measures the load applied to the hitch receiver in each of three orthogonal directions in relation to the vehicle.

Example 3 includes the apparatus of example 1, wherein the load sensing pin is electronically configured to measure a torque loading on the hitch receiver.

Example 4 includes the apparatus of example 1, wherein the load sensing pin is coupled to the crossbar by at least one of a spline, a keyway, or a press fit to prevent rotation between the load sensing pin and the crossbar.

Example 5 includes the apparatus of example 1, wherein the load sensing pin is a magnetoelastic force sensor.

Example 6 includes the apparatus of example 1, wherein the load sensing pin includes at least one of a strain gauge or a load cell.

Example 7 includes the apparatus of example 1, wherein the load sensing pin further measures a torque on the hitch receiver.

Example 8 includes the apparatus of example 7, further including a camera to determine a distance between the hitch receiver and a trailer hitch ball, the load measured by the load sensing pin applied at the trailer hitch ball.

Example 9 includes the apparatus of example 8, further including a hitch pin load manager to correct the load measured by the load sensing pin based on the distance between the hitch receiver and the trailer hitch ball and the measured torque.

Example 10 includes the apparatus of example 1, further including a hitch pin load manager to determine whether the vehicle is stationary or moving.

Example 11 includes the apparatus of example 10, wherein, when the hitch pin load manager determines that the vehicle is moving, the hitch pin load manager subtracts a previous horizontal load from a current horizontal load to calculate a dynamic horizontal load exerted on the crossbar.

Example 12 includes an apparatus comprising a rear facing camera of a vehicle, a load sensing pin to measure a first load transferred from a hitch receiver to a crossbar of a vehicle, and a hitch pin load manager to calculate a second measured load based on the first measured load and position data of the hitch receiver determined by the rear facing camera when the first measured load is saturated.

Example 13 includes the apparatus of example 12, wherein the position data determined by the rear facing camera of the vehicle includes a hitch mount length or a hitch mount drop.

Example 14 includes the apparatus of example 13, wherein the hitch pin load manager calculates the second measured load based on the hitch mount length or the hitch mount drop and a torque measured at the crossbar by the load sensing pin.

Example 15 includes the apparatus of example 12, wherein, when the measured load is not saturated, the hitch pin load manager is to determine a vertical load and a horizontal load measured at the crossbar.

Example 16 includes the apparatus of example 15, wherein the hitch pin load manager is further to output the vertical load and the horizontal load to a display for display to a driver.

Example 17 includes a tangible computer readable storage medium comprising instructions that, when executed, cause a machine to at least determine, using a rear facing camera coupled to the vehicle, position data of a hitch receiver of the vehicle, measure a first load transferred from the hitch receiver to a crossbar of the vehicle, and, when the first measured load is saturated, calculate a second measured load based on the first measured load and the position data.

Example 18 includes the tangible computer readable storage medium of example 17, wherein the position data determined by the rear facing camera of the vehicle includes a hitch mount length or a hitch mount drop.

Example 19 includes the tangible computer readable storage medium of example 18, wherein the instructions, when executed, further cause the machine to calculate the second measured load based on the hitch mount length or the hitch mount drop and a torque measured at the crossbar by the load sensing pin.

Example 20 includes the tangible computer readable storage medium of example 17, wherein the instructions, when executed, further cause the machine to, when the first measured load is not saturated, determine a vertical load and a horizontal load measured at the crossbar.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a load sensing pin coupled to a hitch receiver of a vehicle, the load sensing pin disposed in a cavity of a crossbar that is to couple the hitch receiver to the vehicle, wherein the load sensing pin is to measure a load transferred from the hitch receiver to the crossbar, the crossbar extending laterally at a rear of the vehicle to couple the hitch receiver to the vehicle.

2. The apparatus of claim 1, wherein the load sensing pin measures the load applied to the hitch receiver in each of three orthogonal directions in relation to the vehicle.

3. The apparatus of claim 1, wherein the load sensing pin is electronically configured to measure a torque loading on the hitch receiver.

4. The apparatus of claim 1, wherein the load sensing pin is coupled to the crossbar by at least one of a spline, a keyway, or a press fit to prevent rotation between the load sensing pin and the crossbar.

5. The apparatus of claim 1, wherein the load sensing pin is a magnetoelastic force sensor.

6. The apparatus of claim 1, wherein the load sensing pin includes at least one of a strain gauge or a load cell.

7. The apparatus of claim 1, wherein the load sensing pin further measures a torque on the hitch receiver.

8. The apparatus of claim 7, further including a camera to determine a distance between the hitch receiver and a trailer hitch ball, the load measured by the load sensing pin applied at the trailer hitch ball.

9. The apparatus of claim 8, further including a hitch pin load manager to correct the load measured by the load sensing pin based on the distance between the hitch receiver and the trailer hitch ball and the measured torque.

10. The apparatus of claim 1, further including a hitch pin load manager to determine whether the vehicle is stationary or moving.

11. The apparatus of claim 10, wherein, when the hitch pin load manager determines that the vehicle is moving, the hitch pin load manager subtracts a previous horizontal load from a current horizontal load to calculate a dynamic horizontal load exerted on the crossbar.

12. An apparatus, comprising:
a rear facing camera of a vehicle;
a load sensing pin to measure a first load transferred from a hitch receiver to a crossbar of the vehicle; and
a hitch pin load manager to calculate a second measured load based on the first measured load and position data of the hitch receiver determined by the rear facing camera when the first measured load is saturated.

13. The apparatus of claim 12, wherein the position data determined by the rear facing camera of the vehicle includes a hitch mount length or a hitch mount drop.

14. The apparatus of claim 13, wherein the hitch pin load manager calculates the second measured load based on the hitch mount length or the hitch mount drop and a torque measured at the crossbar by the load sensing pin.

15. The apparatus of claim 12, wherein, when the first measured load is not saturated, the hitch pin load manager is to determine a vertical load and a horizontal load measured at the crossbar.

16. The apparatus of claim 15, wherein the hitch pin load manager is further to output the vertical load and the horizontal load to a display for display to a driver.

* * * * *